(12) United States Patent
Verdura et al.

(10) Patent No.: US 7,168,178 B2
(45) Date of Patent: Jan. 30, 2007

(54) RULER WITH RUBBER OVERMOLDED TO STAINLESS STEEL BASE

(76) Inventors: Javier Verdura, 41 Stone Manor Dr., Milford, CT (US) 06460; Erik J. Moses, 869 Chapel St., 3rd floor, New Haven, CT (US) 06515; Daniel P. Sterling, 14 Glenwood Ave., Apt. 8, Norwalk, CT (US) 06854; Jonathan A. Lee, 157½ Kings Hwy., Milford, CT (US) 06460; Stuart D. Farnworth, 5 Spicer Ct., Westport, CT (US) 06880

( * ) Notice: Subject to any disclaimer, the term of this patent is extended or adjusted under 35 U.S.C. 154(b) by 0 days.

(21) Appl. No.: 11/230,126

(22) Filed: Sep. 19, 2005

(65) Prior Publication Data

US 2006/0162089 A1 Jul. 27, 2006

Related U.S. Application Data

(60) Provisional application No. 60/611,359, filed on Sep. 20, 2004.

(51) Int. Cl.
*B43L 13/20* (2006.01)

(52) U.S. Cl. .......................... 33/492; 33/489
(58) Field of Classification Search ............. 33/492, 33/489, 483
See application file for complete search history.

(56) References Cited

U.S. PATENT DOCUMENTS

| | | | | |
|---|---|---|---|---|
| 118,225 A * | 8/1871 | Feusier | ............... | 33/492 |
| 518,758 A * | 4/1894 | Jewell | ............... | 33/492 |
| 700,156 A * | 5/1902 | Simpson | ............... | 33/489 |
| 1,377,671 A * | 5/1921 | Dieckmann | ............... | 33/483 |
| 2,522,908 A * | 9/1950 | Szabo | ............... | 33/489 |
| 3,406,456 A * | 10/1968 | Schleich | ............... | 33/492 |
| 3,896,554 A * | 7/1975 | Pacion | ............... | 33/489 |
| 4,495,709 A * | 1/1985 | Mainenti | ............... | 33/484 |
| 6,944,963 B2 * | 9/2005 | Amaru | ............... | 33/492 |

* cited by examiner

*Primary Examiner*—Christopher W. Fulton
(74) *Attorney, Agent, or Firm*—Alix, Yale & Ristas, LLP

(57) ABSTRACT

A measuring device having a longitudinally extending polymer portion and a longitudinally extending metal portion secured to the polymer portion. The polymer portion may be molded over one longitudinal edge of the metal portion to thereby permanently secure the portions together. The measuring device may have a longitudinal balance axis disposed between a free edge of the metal portion and a free edge of the polymer portion. The balance axis can be disposed so that when the measuring device is placed on a page the metal portion free edge will contact the page and the polymer portion free edge will be raised. Alternatively, the balance axis can be disposed so that when the measuring device is placed on a page the metal portion free edge and the polymer portion free edge are raised above the page. Pressure on the metal portion will cause the metal portion free edge to contact the page while pressure on the polymer portion free edge will raise the metal portion free edge further off the page.

13 Claims, 5 Drawing Sheets

RULER WITH RUBBER OVERMOLDED TO STAINLESS STEEL BASE

CROSS REFERENCE TO RELATED APPLICATIONS

This application claims the benefit of U.S. Provisional Application No. 60/611,359, filed Sep. 20, 2004, the contents of which are incorporated by reference in their entirety.

FIELD OF THE INVENTION

This invention relates generally to measuring devices such as rulers.

BACKGROUND OF THE INVENTION

Solid metal rulers or rulers having metal edges are well known. The solid metal rulers are typically planar and lie flat along a page. When a writing instrument, such as a marker or pen, is used to draw a line along the edge of the ruler, ink is wicked between the metal edge and the page leading to staining of the edge and the page. Metal rulers may have projections or feet to raise the edge above the page. Such projections lessen wicking when a writing instrument is used but make it more difficult to precisely align the edge with the page. Rulers having a metal edge inset into a body are also known but suffer from the same problems as a metal ruler. What is needed is a ruler having a straight edge that is selectively positionable adjacent a page for close alignment while being easily moved away from the page to lessen wicking.

SUMMARY OF THE INVENTION

An object of the invention is to provide an economical measuring and drawing device having a desirable appearance.

Another object of the invention is to provide a ruler that allows drawing while lessening ink staining on the page.

Other objects and advantages of the invention will become apparent from the drawings and the specification.

Briefly stated, the invention in a preferred form is a measuring device having a longitudinally extending polymer portion and a longitudinally extending metal portion secured to the polymer portion. In one advantageous embodiment, the polymer portion is molded over one longitudinal edge of the metal portion to thereby permanently secure the portions together. In another advantageous embodiment, the measuring device has a longitudinal balance axis disposed between a free edge of the metal portion and a free edge of the polymer portion. The balance axis can be disposed so that when the measuring device is placed on a page the metal portion free edge will contact the page and the polymer portion free edge will be raised. Alternatively, the balance axis can be disposed so that when the measuring device is placed on a page the metal portion free edge and the polymer portion free edge are raised above the page. Pressure on the metal portion will cause the metal portion free edge to contact the page while pressure on the polymer portion free edge will raise the metal portion free edge further off the page.

In general, the invention may be alternately formulated to comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

BRIEF DESCRIPTION OF THE DRAWINGS

Other objects and advantages of the invention will be evident to one of ordinary skill in the art from the following detailed description made with reference to the accompanying drawings, in which.

DETAILED DESCRIPTION

The novel features which are considered characteristic for the invention are set forth in the appended claims. The invention itself, however, both as to its construction and its method of operation, will be best understood from the following description and accompanying drawings wherein like numerals designate like components throughout.

Figure 1:
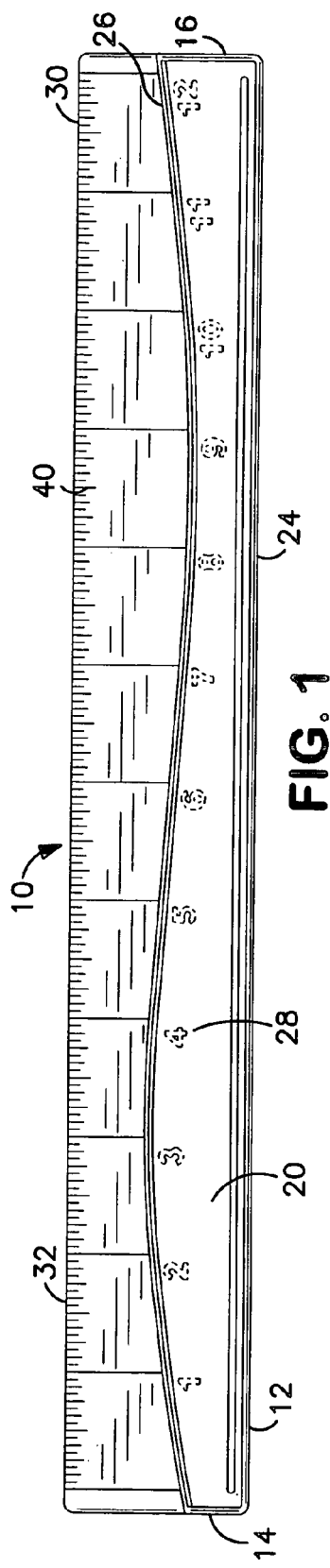
FIG. 1 is a top, plan view of one embodiment of the polymer overmolded metal ruler.
Figure 2:
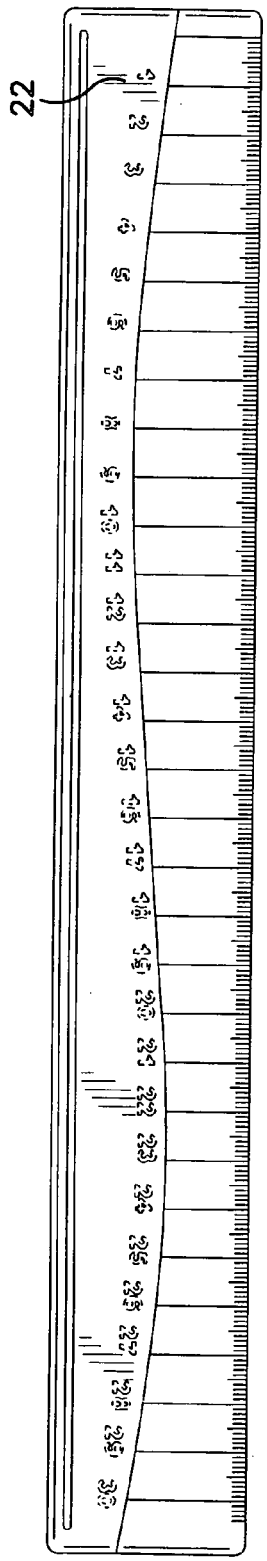
FIG. 2 is a bottom plan view of one embodiment of the polymer overmolded metal ruler.
Figure 3:
FIG. 3 is a polymer portion free edge elevational view of one embodiment of the polymer overmolded metal ruler.
Figure 4:
FIG. 4 is a metal portion free edge elevational view of one embodiment of the polymer overmolded metal ruler.

As shown in FIG. 1, the measuring device 10 comprises a polymer portion 12 longitudinally extending from a first end 14 to an opposing second end 16. The polymer portion 12 has a viewing face 20 and a support face 22 opposing the viewing face 20. The terms viewing face and support face are meant to be descriptive and not limiting. Either face may be a viewing face or a support face. The polymer portion 12 has a free edge 24 and a pivot or molded edge 26. It may be advantageous for measuring and use to have the free edge 24 disposed in a straight line between the first 14 and second 16 ends. The molded edge 26 preferably describes a nonlinear line between the first and second edges as shown best in FIGS. 1 and 9. This nonlinear configuration for the molded edge 26 provides a pleasing and unusual appearance while reducing the amount of polymeric material used for the measuring device 10. In one advantageous variation shown in FIGS. 9 and 10 the molded edge 26 has a sinusoidal shape comprising a plurality of peaks and valleys. With reference again to FIG. 1 the polymer portion viewing face 20 and/or support face 22 may have indicia 28 such as names or information molded therein.

Figure 6:
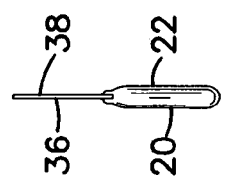
FIG. 6 a view of the opposing end of the ruler of FIG. 5.
Figure 5:
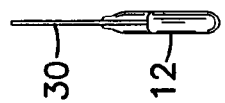
FIG. 5 is a view of one end of an embodiment of the polymer overmolded metal ruler.
Figure 7:
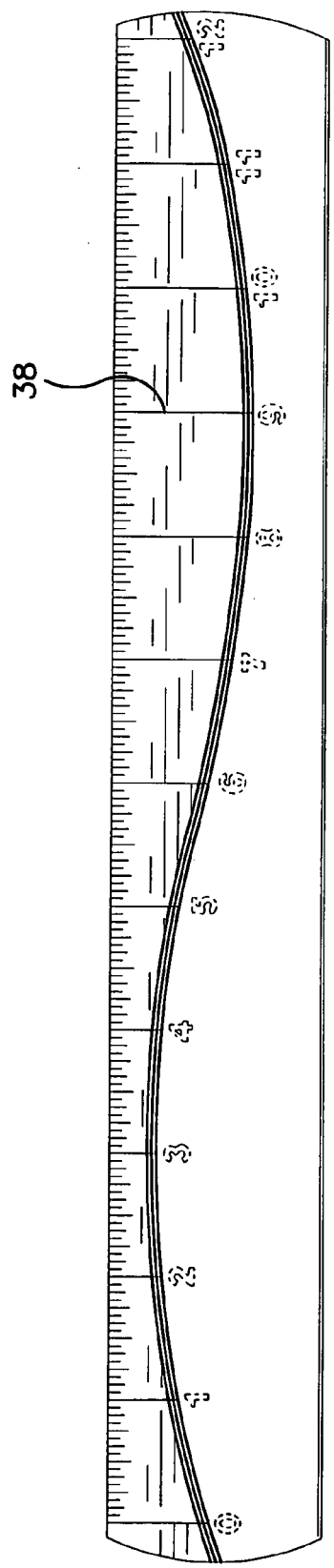
FIG. 7 is a top, plan view of another embodiment of the polymer overmolded metal ruler.

A metal portion 30 has a substantially straight free edge 32 longitudinally extending from the first end 14 to the opposing second end 16. The ends of the metal portion 30 may be aligned with the ends of the polymer portion 12. However, such alignment is not necessary for function of the measuring device and the ends of the metal portion may be disposed inwardly or outwardly of the respective ends of the polymer portion to provide a desired aesthetic appearance. A mounted edge 34 (shown best in FIG. 8) opposes the free edge 32. While the mounted edge may be straight, in some variations it may be desirable to provide a mounted edge having apertures or a nonlinear profile to enhance the attachment of the metal portion to the polymer portion. As shown in FIGS. 1 and 6 the metal portion has a viewing face 36 and an opposing under face 38. The terms viewing face and under face are meant to be descriptive and not limiting. Either face may be a viewing face or an under face.

Figure 8:
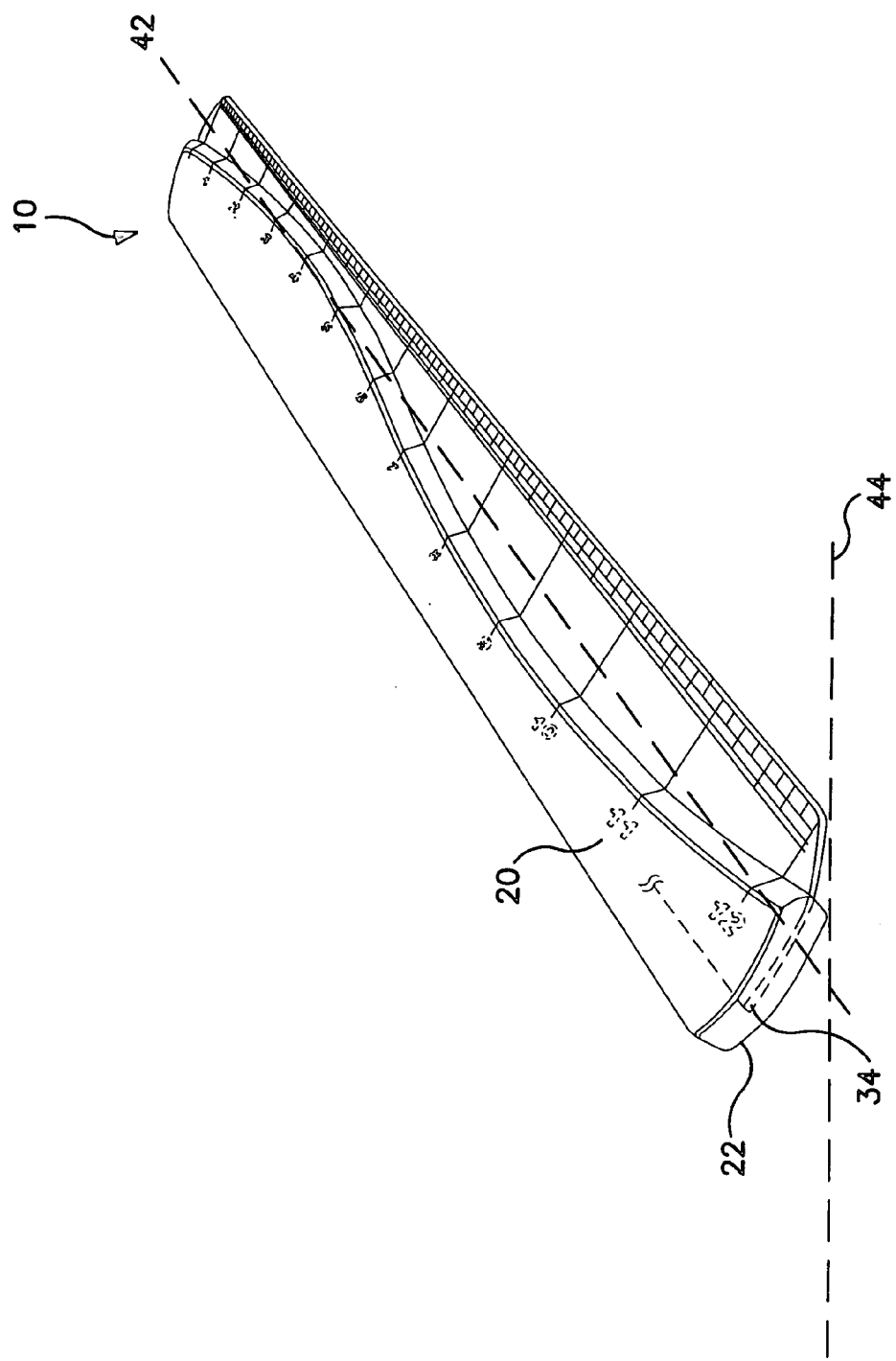
FIG. 8 is a perspective view of another embodiment of the polymer overmolded metal ruler.

The metal portion mounted edge 34 is disposed between the polymer portion viewing face 20 and support face 22 and secured to the molded edge 26. Preferably, the mounted edge 34 is disposed some distance within the body of the polymer portion as shown in FIG. 8. It is typically advantageous to include indicia 40 on the metal portion 30 for measuring. The metal portion 30 may also include reference numerals (not shown).

In one variation shown best in FIG. 8, the measuring device 10 has a longitudinally extending balance point or axis 42. This balance axis 42 is disposed between the metal portion free edge 32 and the polymer portion free edge 24. When the support face 22 of this measuring device variation is placed on a page 44, the metal portion free edge 32 will tip or roll on the balance axis into contact with the page and the polymer portion free edge 24 will be raised away from the page. In this variation, a plane is formed between the metal portion free edge 32 and selected sections of the polymer portion molded edge 26.

Figure 9:
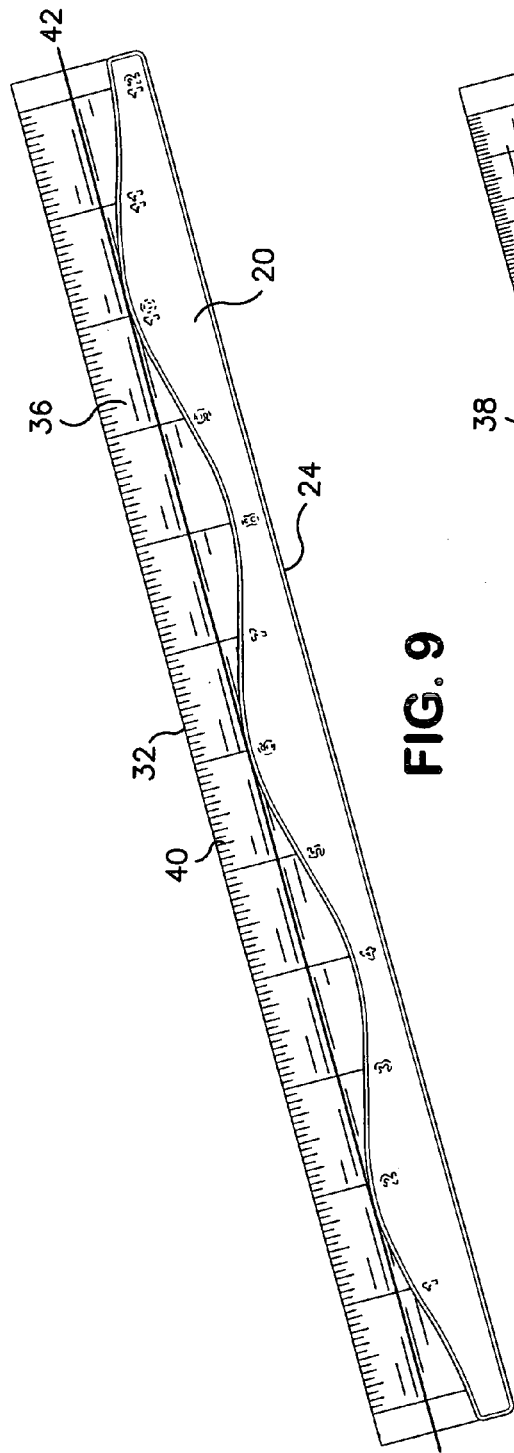
FIG. 9 is a top plan view of another embodiment of the polymer overmolded metal ruler.
Figure 10:
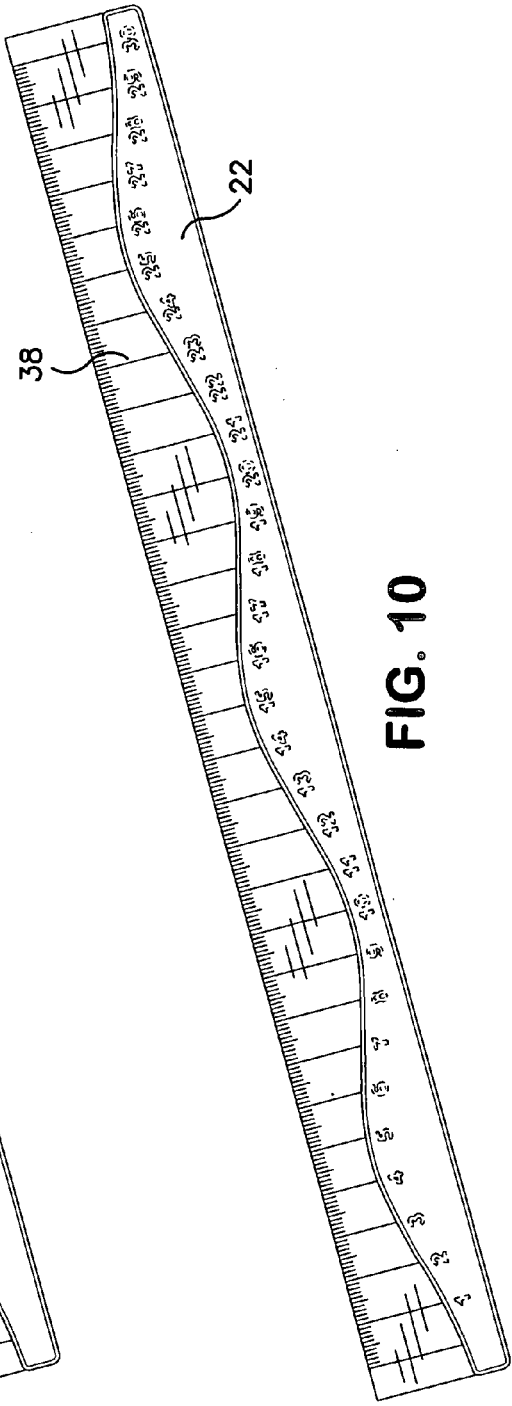
FIG. 10 is a bottom plan view of another embodiment of the polymer overmolded metal ruler.

In another variation shown in FIGS. 9 and 10, the measuring device 10 has a longitudinally extending balance axis 42 disposed so that when the support face 22 is placed on a page both the metal portion free edge 32 and the polymer portion free edge 24 are raised slightly above the page. Pressure on the metal portion 30 will cause the metal portion free edge 32 to contact the page while pressure on the polymer portion free edge 24 will raise the metal portion free edge 32 further off the page. In either above variation only the metal portion free edge 32 contacts the page. The remainder of the metal portion under face 38 remains displaced away from the page.

These measuring device variations provide a number of benefits to the user. In the rest position contact of the metal portion straight edge with the page makes it easier for the user to precisely align measuring device with text or other objects on the page. Further, since only the metal portion straight edge, and not the whole face of the metal portion, contacts the page, wicking of ink from a writing device in between a metal portion and page is reduced. In applications where wicking of ink from a writing device must be maximally reduced, the user can apply a force to the polymer portion viewing face to pivot the support base into contact with the page and raise the metal portion straight edge away from the page. Having the metal portion straight edge displaced from the page greatly reduces the chances of wicking ink from a writing device onto the page. The use of resilient materials having a tacky feel for the polymer portion 12 is especially beneficial so that the measuring device does not move on the page when the support face is pushed into contact with the page.

Many polymeric materials that can be molded can be used for the polymer portion 12. For example, the polymer portion 12 could be made from a harder polymer such as nylon or DELRIN. Such polymers, especially when reinforced, would provide stiffness to the resulting measuring device. Advantageously, the polymer portion 12 is prepared from a more resilient polymer to achieve a tacky feel and to provide additional friction between the measuring device and the page. As used herein the term "resilient" means the ability of the material to be deformed by a user's hands, for example, a fingernail, and to substantially recover its size and form following this deformation. The resilient polymers would include, for example, elastomers, synthetic rubbers and natural rubbers. Advantageously, the polymer portion 12 is prepared from a rubber or rubber-like material that will prevent movement of the measuring device on the page as well as provide a desired resilient feeling to the user. The polymeric composition would typically include other materials such as plasticizers, lubricating agents, fillers, curing agents, and/or other materials. A person skilled in the art would know how to choose a polymeric material and additives to achieve desirable chemical and physical properties for the measuring device.

Many metals would be suitable for use as a metal portion 30. Thus, the choice of metal used for the metal portion 30 will depend on considerations of cost, ease of manufacture and aesthetics. An advantageous variation of the invention uses stainless steel for the metal portion 30. The use of stainless steel is surprisingly counterintuitive for this application as the cost of stainless steel is substantially higher than the price of carbon steels. However, stainless steel provides an appearance that is desired by many users. Further, stainless steel is more resistant to rusting than carbon steel so that no coatings are typically required to maintain this desirable appearance.

While the metal portion 30 may be manufactured in any number of ways, it is believed that a metal stamping operation (not shown) could provide a suitable metal portion 30 at a relatively low cost. In a metal stamping operation, metal feedstock such as a metal coil is loaded into dies within a press. The dies are moved together so that the periphery of the metal portion 12 is sheared from the metal feedstock. If desired, indicia 38 such as lines or numerals can be pressed into the metal portion 30 during the same operation. Alternative methods of manufacturing the metal portion 30, such as machining, waterjet cutting, laser cutting, electron beam cutting, are known to those skilled in the art and can also be employed. The manufactured metal portion 30 may be secondarily processed to remove burrs and sharp edges if desired. Such secondary operations generally involve tumbling the metal portion with ceramic or other media or brushing or hydraulic blasting.

The metal portion 30 can be joined to the polymer portion 12 in a number of ways such as mechanical fastening, adhesive bonding, or molding. Presently, the preferred method of attaching the metal portion 30 to the polymer portion 12 involves molding a prepared polymeric composition over the mounted edge 34 of the metal portion 30. Typically, the metal portion is placed within a mold. A polymeric composition is selectively disposed within the mold and the mold is closed. Heat and pressure are applied to the polymeric composition so that the material flows over the mounted edge and assumes the shape of the mold cavity. When the mold is opened, a measuring device having a formed polymer portion molded over the mounted edge of the metal portion is removed. In different molding operations the polymeric composition can be forced into the closed mold under pressure and molded over the metal portion.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A measuring device comprising:
a polymer portion longitudinally extending from a first end to an opposing second end, the polymer portion having a viewing face, a support face opposing the viewing face, a free edge and a nonlinear molded edge;
a longitudinally extending metal portion having a longitudinally extending, substantially straight edge and an opposing mounted edge, a viewing face and an opposing under face, the mounted edge secured to the polymer portion between the viewing face and the support face and the metal portion extending outwardly from the polymer portion molded edge to terminate in the straight edge; and
a longitudinally extending pivot axis disposed between the polymer portion free edge and the metal portion free edge, wherein when the polymer portion support face is placed on a planar surface the measuring device is pivotable on the axis so that the metal portion free edge is selectively positionable against the planar surface or away from the planar surface.

2. The measuring device of claim 1 wherein the polymer portion viewing face is generally parallel with, but offset from, the metal portion viewing face.

3. The measuring device of claim 1 wherein the polymer portion is comprised of an elastomer.

4. The measuring device of claim 1 wherein the polymer portion is resilient.

5. The measuring device of claim 1 wherein the metal portion is stainless steel.

6. The measuring device of claim 1 wherein when the polymer portion support face is placed on a planar surface the metal portion straight edge will contact the planar surface and the polymer portion free edge will be disposed away from the planar surface.

7. The measuring device of claim 1 wherein when the polymer portion support face is placed on a planar surface the metal portion straight edge will be disposed away from the planar surface and the polymer portion free edge will be disposed away from the planar surface.

8. The measuring device of claim 1 wherein the polymer portion nonlinear molded edge has a repeating, sinusoidal shape.

9. The measuring device of claim 1 wherein the polymer portion nonlinear molded edge has a repeating, sinusoidal shape comprising three peaks and four valleys.

10. The measuring device of claim 1 wherein the metal portion comprises a measuring line and the polymer portion viewing face comprises a numeral aligned with the measuring line.

11. The measuring device of claim 1 wherein metal portion mounted edge extends substantially continuously in a line from the first end to the second end.

12. The measuring device of claim 1 wherein the metal portion mounted edge is substantially centered between the viewing face and the support face.

13. A ruler, comprising:
a resilient polymer portion longitudinally extending from a first end to an opposing second end, the polymer portion having a viewing face comprising a numeral, a support face opposing the viewing face, a free edge and a molded edge, the molded edge having a repeating, sinusoidal shape with a plurality of peaks and valleys;
a longitudinally extending metal portion having a substantially straight edge extending from about the first end to about the second end, a mounted edge opposing the straight edge, a viewing face comprising a measuring line aligned with the polymer portion numeral and an under face opposing the viewing face, the mounted edge secured to the polymer portion between the viewing face and the support face and the metal portion extending outwardly from the polymer portion molded edge to terminate in the straight edge, the metal portion viewing face being generally parallel with, but offset from, the polymer portion viewing face; and
a longitudinally extending pivot axis disposed between the polymer portion free edge and the metal portion free edge, wherein when the polymer portion support face is placed on a planar surface the measuring device is pivotable on the axis so that the metal portion free edge is selectively positionable against the planar surface or away from the planar surface.

* * * * *